US012607836B2

(12) United States Patent
Li et al.

(10) Patent No.: US 12,607,836 B2
(45) Date of Patent: Apr. 21, 2026

(54) OPTICAL ELEMENT

(71) Applicants: The University of Adelaide, Adelaide (AU); Universität Stuttgart, Stuttgart (DE)

(72) Inventors: Jiawen Li, Adelaide (AU); Robert McLaughlin, Adelaide (AU); Simon Thiele, Stuttgart (DE); Alois Herkommer, Stuttgart (DE); Harald Gießen, Stuttgart (DE)

(73) Assignees: The University of Adelaide, Adelaide (AU); Universität Stuttgart, Stuttgart (DE)

( * ) Notice: Subject to any disclaimer, the term of this patent is extended or adjusted under 35 U.S.C. 154(b) by 503 days.

(21) Appl. No.: 18/006,373

(22) PCT Filed: Jul. 23, 2021

(86) PCT No.: PCT/AU2021/050797
§ 371 (c)(1),
(2) Date: Jan. 20, 2023

(87) PCT Pub. No.: WO2022/016230
PCT Pub. Date: Jan. 27, 2022

(65) Prior Publication Data
US 2023/0341668 A1      Oct. 26, 2023

(30) Foreign Application Priority Data

Jul. 23, 2020   (AU) ................................ 2020902567

(51) Int. Cl.
| | |
|---|---|
| *G02B 17/08* | (2006.01) |
| *G02B 6/26* | (2006.01) |
| *G02B 17/00* | (2006.01) |
| *G02B 21/00* | (2006.01) |
| *G02B 23/24* | (2006.01) |

(52) U.S. Cl.
CPC ......... *G02B 17/0856* (2013.01); *G02B 6/262* (2013.01); *G02B 17/006* (2013.01); *G02B 23/2469* (2013.01); *G02B 21/0056* (2013.01)

(58) Field of Classification Search
CPC .............. A61B 5/0066; A61B 1/00117; A61B 1/00165; A61B 5/6852; A61B 5/0084; A61B 1/00183
See application file for complete search history.

(56) References Cited

U.S. PATENT DOCUMENTS

| | | | |
|---|---|---|---|
| 2015/0036146 A1* | 2/2015 | Staloff | ................. A61B 1/0008 356/479 |
| 2015/0238084 A1 | 8/2015 | Tearney et al. | |
| 2018/0344130 A1 | 12/2018 | Gmeiner et al. | |

FOREIGN PATENT DOCUMENTS

| | | |
|---|---|---|
| JP | 2001264246 A | 9/2001 |
| JP | 2016532489 A | 10/2016 |

(Continued)

OTHER PUBLICATIONS

Gissibl, Timo, Simon Thiele, Alois Herkommer, and Harald Giessen. "Sub-Micrometre Accurate Free-Form Optics by Three-Dimensional Printing on Single-Mode Fibres." Nature Communications 7, No. 1 (Jun. 24, 2016). https://doi.org/10.1038/ncomms11763. (Year: 2016).*

(Continued)

*Primary Examiner* — Alexander P Gross
(74) *Attorney, Agent, or Firm* — Knobbe, Martens, Olson & Bear, LLP

(57) ABSTRACT

An optical element (100) is provided comprising a first surface (102) for emitting and/or receiving electromagnetic radiation, the first surface being arranged for optically coupling to, or being optically coupled to, a portion of an optical fibre (104) having an axis. The optical element (100) comprising a second surface (106) positioned for emitting (Continued)

and/or receiving electromagnetic radiation in a direction transversal to the axis of the optical fibre (104), wherein the optical element (100) has a first focal length for electromagnetic radiation emitted and/or received by an inner portion of the second surface (106) and a second focal length for electromagnetic radiation emitted and/or received by an outer portion of the second surface (106), the first and second focal lengths being different focal lengths. A method of forming an optical device comprising the optical element (100)) and further comprising an optical fibre coupled to the optical element is also provided.

20 Claims, 8 Drawing Sheets

(56) References Cited

FOREIGN PATENT DOCUMENTS

| | | | |
|---|---|---|---|
| JP | 2019533834 A | 11/2019 | |
| WO | WO-2011149972 A2 * | 12/2011 | ........... A61B 5/0066 |
| WO | 2018/009529 A1 | 1/2018 | |

OTHER PUBLICATIONS

European Search Report dated Nov. 17, 2023 for EP Application No. 21846362.8 in 9 pages.
International Search Report issued for International Patent Application No. PCT/AU2021/050797, dated Aug. 27, 2021 in 3 pages.
International Preliminary Report on Patentability issued for International Patent Application No. PCT/AU2021/050797, dated Mar. 1, 2022 in 48 pages.
Obel, "Combined Fluorescence & Oct" retrieved from internet on Aug. 26, 2021, <URL: https://web.archive.org/web/20200307134537/http://obel.ee.uwa.edu.au/research/techniques/combined-fluorescence-oct/>published on Mar. 7, 2020 as per Wayback Machine.
Gissibl, Timo et al., "Sub-micrometre accurate free-form optics by three-dimensional printing on single-mode fibres" Nature communicaitons, Jun. 2016, pp. 1-9, vol. 7, No. 11763.
1st Office Action for corresponding Indian Patent Application No. 202317008175, dated Dec. 19, 2025.

* cited by examiner

100

106

102

104

105

100 μm

CONV. LENS (a)

FRESNEL LENS (b)

DOE / METALENS (c)

TIR
FACET (d)

OPTICAL ELEMENT

CROSS-REFERENCE TO RELATED APPLICATIONS

This application is the U.S. National Phase under 35. U.S.C. § 371 of International Application PCT/AU2021/050797, filed Jul. 23, 2021, which claims priority to Australian Patent Application No. 2020902567, filed Jul. 23, 2020. The disclosures of the above-described applications are hereby incorporated by reference in their entirety.

FIELD OF THE INVENTION

The present invention broadly relates to an optical element and relates particularly, though not exclusively, to an optical element, such as a lens, for an optical fibre and which may form part of a biomedical device.

BACKGROUND OF THE INVENTION

Optical imaging and characterisation techniques are of increasing interest for medical device applications. The use of optical fibres and optical fibre components enables the design of small-scale optical probes for such devices, which can be inserted into tissue or body lumen for imaging or characterisation purposes while being less invasive than conventional larger scale devices. Such devices may be suitable for characterisation or imaging or using different techniques simultaneously and may even use a single optical fibre to convey optical signals associated with the different techniques. Realizing different imaging and characterisation techniques using a single fibre enables co-located measurements and imaging using a miniature device, which improves accessibility of delicate narrow luminal organs, such as coronary arteries and small airways.

Recently optical probes for optical coherence tomography (OCT) have been developed in which OCT signals are captured by the core of the double-clad optical fibre. An inner cladding of the same double-clad optical fibre has been used for simultaneously guiding of optical signals or intensity associated with other characterisation techniques including spectroscopy techniques such as fluorescence and absorption spectroscopy. Such single fibre-based OCT+fluorescence techniques have been successfully used in the blood vessels of animals and humans. This technique is a promising candidate for providing accurate diagnosis of high-risk plaques, which is the major precursor lesion to heart attacks.

However, OCT has optical requirements that contrast those of fluorescence techniques. In order to provide high quality OCT data or images, focusing optics with a low numerical aperture to enable long working distance (and large depth of field) is needed while fluorescence techniques benefit from a large numerical aperture in order to improve collection efficiency of the fluorescence radiation. However, probes with lenses having a large numerical aperture typically have a small depth of field. It follows that a probe that has ideal optical properties for fluorescence techniques does not have ideal properties for OCT techniques. Other optical techniques also have specific optimal configurations of their optical system, and these may be in conflict when multiple techniques are implemented within a single system. These optical techniques include OCT, fluorescence, confocal microscopy, multiphoton microscopy, diffuse optical tomography, total internal reflection fluorescence microscopy, phase contrast microscopy, stimulated emission depletion microscopy, near-field scanning optical microscopy, differential interference contrast microscopy, second harmonic imaging microscopy, reflectance spectroscopy, Raman spectroscopy and optical coherence elastography.

There is a need for technological advancement.

SUMMARY OF THE INVENTION

In a first aspect of the present invention there is provided an optical element comprising:

a first surface for emitting and/or receiving electromagnetic radiation, the first surface being arranged for optically coupling to, or being optically coupled to, a portion of an optical fibre, the optical fibre having an axis; and a second surface positioned for emitting and/or receiving electromagnetic radiation in a direction transversal to the axis of the optical fibre;

wherein the optical element has a first focal length for electromagnetic radiation emitted and/or received by an inner portion of the second surface and a second focal length for electromagnetic radiation emitted and/or received by an outer portion of the second surface, the first and second focal lengths being different focal lengths; and wherein the inner portion and the outer portion of the second surface are optimised for use of the optical element to acquire measurements at different acquisition parameters using one or more optical technologies.

In one embodiment, the inner portion and the outer portion of the second surface are optimised for use of the optical element to acquire measurements at different acquisition parameters using at least two different optical technologies.

The optical element may be integrally formed.

The outer portion of the second surface may entirely surround the inner portion of the second surface.

One or each of the first and second surfaces may comprise one or more contiguous surface portions which may be smooth surface portions.

In some embodiments, the focal lengths may be defined as a function of electromagnetic radiation wavelength. The first focal length is in one embodiment larger than the second focal length. In this case a depth of field associated with the inner portion of the second surface is larger than the depth of field associated with the outer portion of the second surface.

The optical element may be arranged such that at least a portion or the majority of electromagnetic radiation received within the inner portion of the second surface is directed into a central region, such as a core region, of the optical fibre and at least a portion or the majority of electromagnetic radiation received within the outer portion of the second surface is directed into a region of the optical fibre surrounding the central region, such as a cladding or inner cladding region of the optical fibre.

The optical element in accordance with embodiments of the present invention consequently provides at least partially separated pathways for electromagnetic radiation received by the outer portion of the second surface and electromagnetic radiation received by the inner portion of the second surface.

Embodiments of the present invention have the advantage that it is possible to customise the optical properties of each portion of the lens for different optical measurement technologies. This has an advantage over lens systems with only a single focal length, where the differing optical requirements of the multiple technologies may result in sub-optimal performance. For example, OCT is an optical technology in which it is desirable to have a large depth of field, which may be associated with a large focal length. In contrast, detection of fluorescence radiation, which is emitted in random directions, requires a large numerical aperture to enable high sensitivity measurements. This may be associated with a small focal length. The inner portion of the second surface may have a large focal length at each wavelength of electromagnetic radiation, which enables a large depth of field when used with OCT. The outer portion may have a short focal length at each wavelength of electromagnetic radiation, which enables a large numerical aperture allowing highly efficient collection of fluorescence radiation by the outer portion.

In one embodiment, the optical fibre may comprise an inner core used for OCT measurements and an inner cladding used to collect fluorescence radiation.

In one embodiment the outer portion has focal lengths that result in a numerical aperture greater than the numerical aperture of the inner portion by at least 0.1, 0.2, 0.3, 0.4, 0.5, 0.6, 0.7 or even 0.8.

The optical element may have any suitable diameter in a direction along the axis of the optical fibre, but in specific embodiments of the present invention has a diameter less than 1 mm, 0.5 mm, 0.2 mm or even 0.1 mm.

The second surface of the optical element may be restricted to lying within a circle and may have a diameter of less than 1 mm, 0.5 mm, 0.2 mm or even 0.1 mm. The inner portion of the second surface may be restricted to lying within a circle and may have a diameter of less than 1 mm, 0.5 mm, 0.2 mm, 0.1 mm or even less than 0.01 mm. The outer portion of the second surface may also be restricted to lying within a circle and may have an outer diameter of less than 1 mm, 0.5 mm, 0.2 mm, 0.1 mm or even less than 0.01 mm The optical element may be arranged such that the second surface is positioned for emitting and/or receiving electromagnetic radiation in a direction that is substantially perpendicular to the axis of the optical fibre.

The second surface of the optical element may be a surface of a spherical or aspheric lens, an axicon lens, a Fresnel lens, a total internal reflection lens, a diffractive optical element, a metalens, or a combination thereof and may be arranged to correct for chromatic and/or spherical aberration and/or astigmatism. For example, the inner and outer portions of the optical element may include different zones of a Fresnel lens or may comprise lens portions of different curvatures. Further, the optical element may comprise a grating for correcting chromatic aberration or for wavelength specific separation of radiation.

The optical element may further comprise at least one reflective surface which may be a surface having a reflective coating, a dichroic coating or may be a surface positioned for total internal reflection of electromagnetic radiation. The at least one reflective surface may be arranged to direct electromagnetic radiation between the direction along the axis of the optical fibre and the direction transversal to the axis of the optical fibre.

In some embodiments, the reflective surface is planar. In alternative embodiments the reflective surface comprises a smooth surface portion that is not planar. The reflective surface may also be piecewise continuous.

The reflective surface may be shaped to correct for optical aberrations or may have a focusing or defocusing function. One example of an optical aberration may be that caused by other surfaces that the electromagnetic radiation must pass through in order to make an optical measurement, such as an enclosing catheter sheath.

The optical element may be arranged for direct coupling or indirect optical and mechanical coupling to the optical fibre.

Noise of optical signals or cross-talk between optical signal received by the outer portion of the second surface and optical signals received by the inner portion of the second surface may be reduced by optimising the ratio of the diameter of the outer and inner portions of the second surface. For example, the ratio of the outer diameter of the outer and inner portions of the second surface may be 3:1.

In embodiments in which the optical element 100 comprises a reflective surface arranged for total internal reflection, noise of optical signals or cross-talk between optical signals received by the outer portion of the second surface and optical signals received by the inner portion of the second surface 106 may be reduced by optimising the angle between the total internal reflection surface and the axis of the optical fibre. For example, the angle of the total internal reflection surface can be the critical angle for a chosen wavelength of electromagnetic radiation so that some wavelengths will not undergo total internal reflection.

Additionally, or alternatively, noise of optical signals or cross-talk between optical signal received by the outer portion of the second surface 106 and optical signals received by the inner portion of the second surface may be reduced by use of an isolation element on the reflective surface or between the inner and outer portions of the second surface. This isolation element may reflect or absorb electromagnetic radiation over a specific range of wavelengths.

The optical element may be formed using any suitable method, but in specific embodiments is formed using a 3D printing process, such as multi-photon lithography. The optical element 100 is in this embodiment formed directly on an end portion of the optical fibre or may be formed separately. The optical element may be formed from any suitable material, such as a photosensitive material, and in a specific embodiment is formed from "Nanoscribe IP-S".

In a second aspect of the present invention there is provided an optical device comprising the optical element in accordance with the first aspect of the present invention and an optical fibre coupled to the optical element.

The optical fibre may be of any suitable type, but in one embodiment is a no core optical fibre. The optical fibre may comprise a coating, such as a coating comprising a material having a refractive index similar to that of an outer portion of the optical fibre, but selected to absorb electromagnetic radiation at a specific wavelength range of interest in order to reduce an influence of stray electromagnetic radiation at the specific wavelength ranges.

In a third aspect of the present invention there is provided a method of forming the optical device in accordance with the second aspect of the present invention, the method comprising the steps of:

providing a design for the optical element;

providing an optical fibre and positioning an end portion of the optical fibre relative to a multi-photon 3D printing system; and instructing the multi-photon 3D printing system to form the optical element in accordance with the provided design.

The invention will be more fully understood from the following description of specific embodiments of the invention. The description is provided with reference to the accompanying drawings.

DETAILED DESCRIPTION OF SPECIFIC EMBODIMENTS

Figure 1:
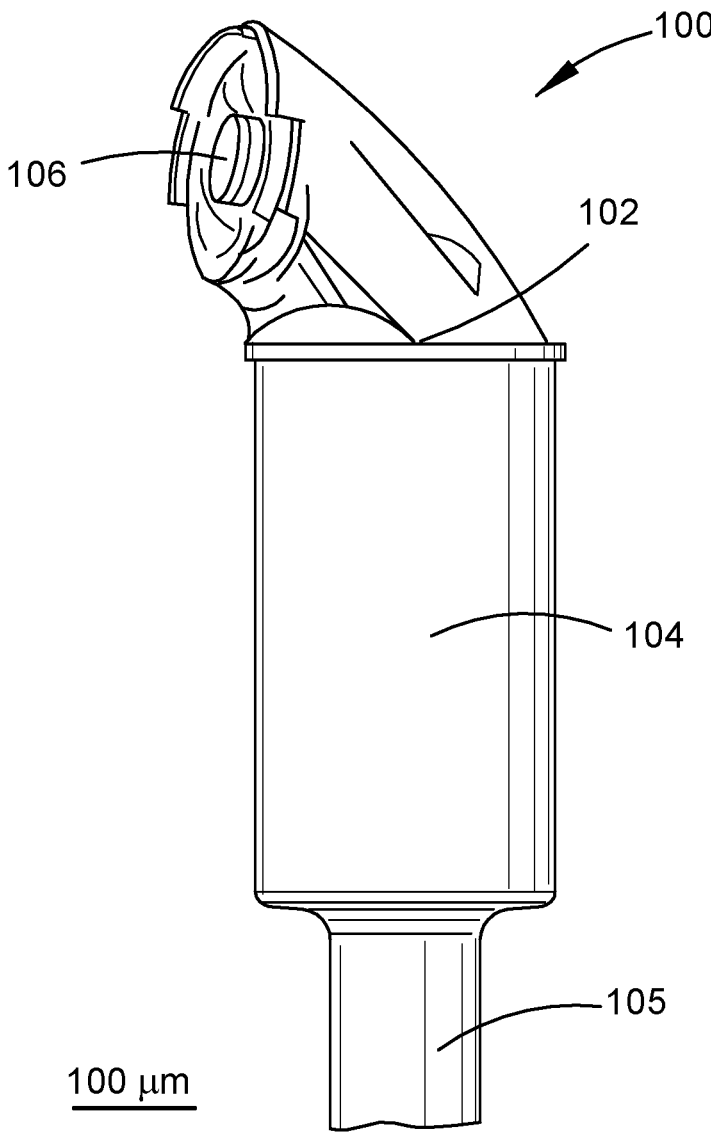
FIG. 1 is a microscope image of an optical element in accordance with an embodiment of the present invention.
Figure 2:
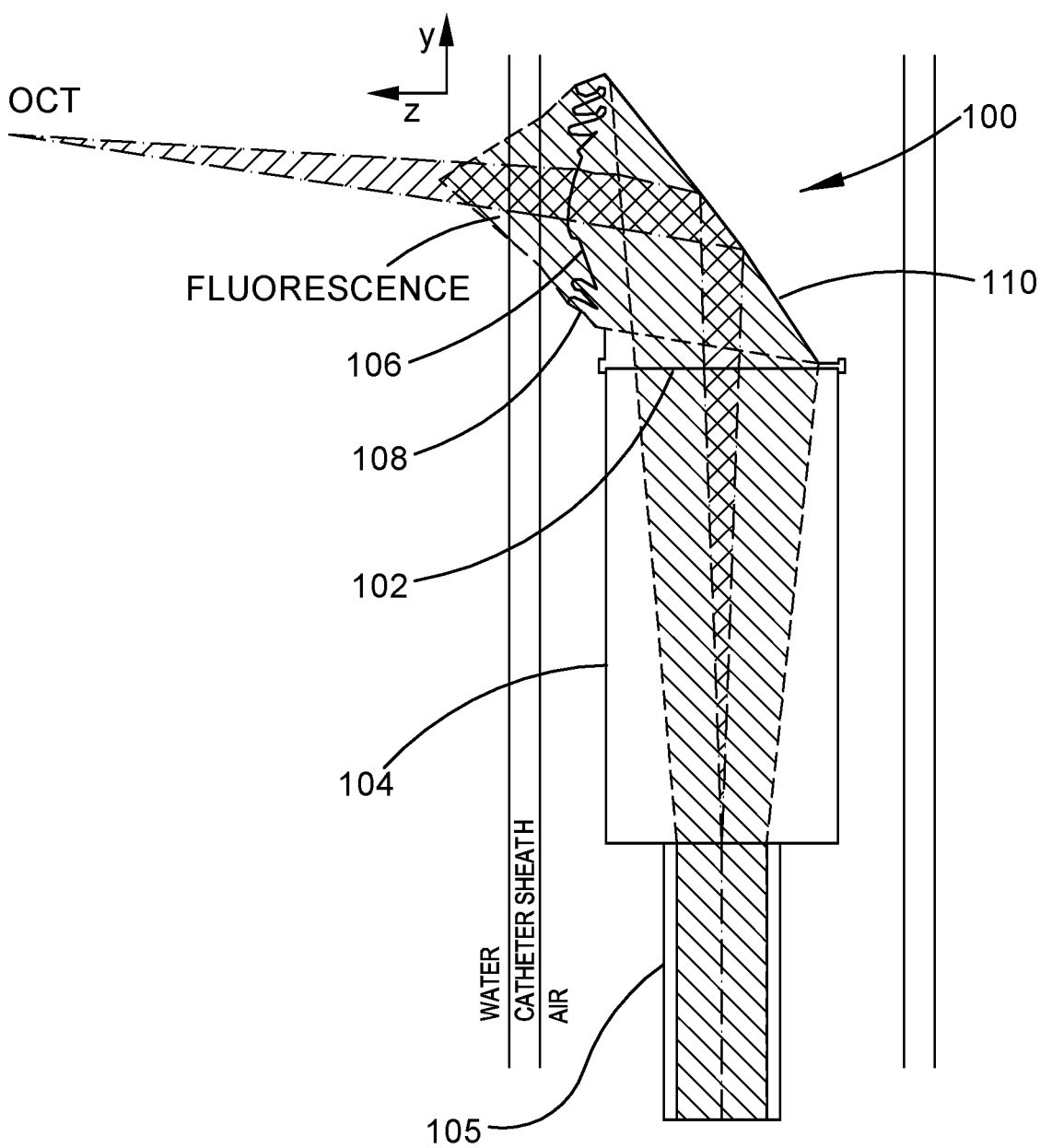
FIG. 2 is a schematic side view of the optical element shown in FIG. 1.
Figure 3:
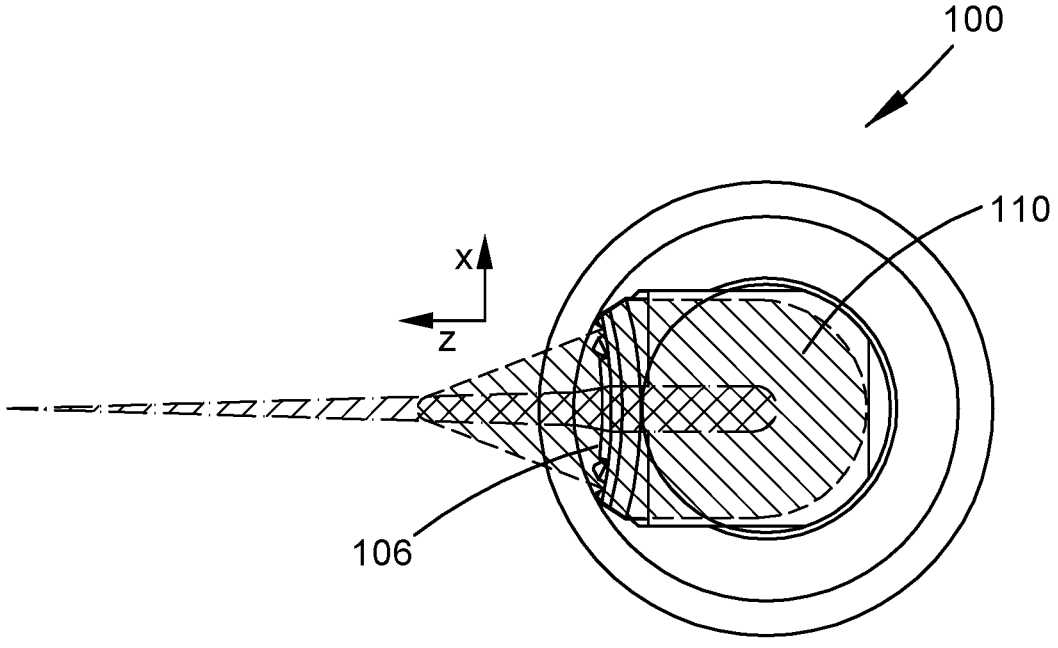
FIG. 3 is a schematic top view of the optical element shown in FIG. 1.

Referring initially to FIGS. 1 to 3, an optical element 100 in accordance with an embodiment of the present invention is now described. The optical element 100 has a first surface 102 for emitting and/or receiving electromagnetic radiation and which is optically coupled to an end-portion of an optical fibre 104. In this embodiment the optical fibre 104 is a no-core fibre which is spliced onto a double-clad optical fibre 105. The optical element 100 is directly formed on the end-portion of the optical fibre 104.

The optical element 100 also has a second surface 106 positioned for emitting and/or receiving electromagnetic radiation in a direction transversal to an axis of the optical fibre 104. In this embodiment the second surface 106 is positioned for emitting and receiving electromagnetic radiation in a direction that is substantially perpendicular to the axis of the optical fibre 104.

The optical element 100 has a first focal length for electromagnetic radiation emitted and/or received by an inner portion of the second surface 106 and a second focal length for electromagnetic radiation emitted and/or received by an outer portion of the second surface 106. The first and second focal lengths are different focal lengths.

The inner portion of the second surface 106 has a larger focal length and larger depth of field, which is advantageous for OCT imaging. The outer portion of the second surface 106 has a shorter focal length than the inner portion, but a larger numerical aperture allowing efficient collection of fluorescence radiation. Other combinations of focal lengths may be chosen. The choice of focal lengths may be selected to optimise optical performance of the optical element 100 with respect to one or more optical technologies. Optical technologies include OCT, fluorescence, confocal microscopy, multiphoton microscopy, diffuse optical tomography, total internal reflection fluorescence microscopy, phase contrast microscopy, stimulated emission depletion microscopy, near-field scanning optical microscopy, differential interference contrast microscopy, second harmonic imaging microscopy, reflectance spectroscopy, Raman spectroscopy and optical coherence elastography.

The inner portion of the second surface 106 is arranged to mainly direct received radiation (such as OCT signals) into an inner portion of the no-core fibre 104 and subsequently into a core region of the optical fibre 105. The outer portion of the second surface 106 (associated with a larger numerical aperture) is arranged to mainly direct radiation (such as fluorescence radiation) into an outer portion of the no-core fibre 104 and subsequently into an inner cladding region of the optical fibre 105. For fluorescence measurements for example, achievable signal-to-noise ratio is related to the numerical aperture of the collection cone. In this embodiment the outer portion of the second surface 106 has a numerical aperture greater than 0.4 resulting in a relatively high signal to noise ratio and corresponding high sensitivity.

The optical element 100 is shaped such that light is directed from the transversal direction to a direction along the axis of the optical fibre 104 using total internal reflection at surface 110. In a variation of the described embodiment the surface 110 may be replaced with a surface having a reflective or dichroic coating and the surface 110 may be a freeform surface.

The optical element 100 may be used for "side-viewing" endoscopic or intravascular probes, which are usually used within a transparent catheter sheath in order to protect tissue within which the probe is being moved during examination and also to prevent contamination of the probe. Such a transparent sheath corresponds optically to a negative cylindrical lens and causes astigmatism. The surface 110 may be shaped to optically correct the astigmatism. Further, the optical element 100 may comprise a grating structure to correct chromatic aberration or achieve colour separation.

The optical element 100 may have any suitable dimension. For example, the second surface 106 of the optical 100 may have an outer diameter in the range of 1 mm to 0.1 mm or even less. The first surface 102 may have an outer diameter that coincides with an outer diameter of the optical fibre 104 to which the optical element 100 is coupled. For example, the first surface 102 may have an outer diameter of less than 1.5 mm to 0.1 mm or less.

The optical element 100 may be structured such that the inner portion of the second surface 106 has a focal length in the range 0.5 mm to 2 mm at a wavelength range of 500 nm to 1900 nm. The inner portion may have any suitable shape, but in one embodiment is circular having an outer diameter that is 10%-90% smaller than an outer diameter of the outer portion of the second surface 106.

Further, the optical element 100 may be structured such that the outer portion of the second surface 106 has a focal length of 0.1 mm-0.5 mm at a wavelength range of 400 nm to 1000 nm. The outer portion of the optical element 100 may have a numerical aperture greater than a numerical aperture of the inner portion by at least 0.1 to 0.8 or more. The outer portion may have any suitable shape, but is in this embodiment ring-shaped.

In one embodiment the optical element 100 is arranged to reduce or avoid cross-talk between radiation received by the outer and inner portions of the optical element 100. Such cross-talk, which may have a detrimental effect on measurement results or image quality, can for example be reduced by optimising the ratio between the diameter of the aperture of the outer portion and the diameter of the aperture of the inner portion of the second surface 106 or optimising the tilt angle of the inner and outer portions. In one example this ratio of tilt angle is 3:1 and the tilt angle is chosen such that radiation having a selected wavelength range will not undergo total internal reflection at reflective surfaces of the optical element 100.

Further, an optical isolation element (not shown) may be used which selectively absorbs or otherwise filters radiation over specific wavelength ranges. The optical isolation element may for example be positioned at surfaces at which received electromagnetic radiation is reflected. Additionally or alternatively, a coating may be applied to an outer surface of the fibre 104 or 105. The coating may be arranged to absorb undesired radiation. For example, the coating may be arranged to absorb stray radiation that is total internally reflected at an interface of the optical fibre 104 or 105. Such stray radiation can be minimised or reduced using a coating on the outside of the optical fibre 104 or 105 having a refractive index similar to that of the optical fibre 104 or 105 at the outside, but absorbing light over a selected wavelength range.

The optical element 100 may be integrally formed from an optically transmissive material using a 3D printing process, which will be described further below in more detail.

Figure 4:
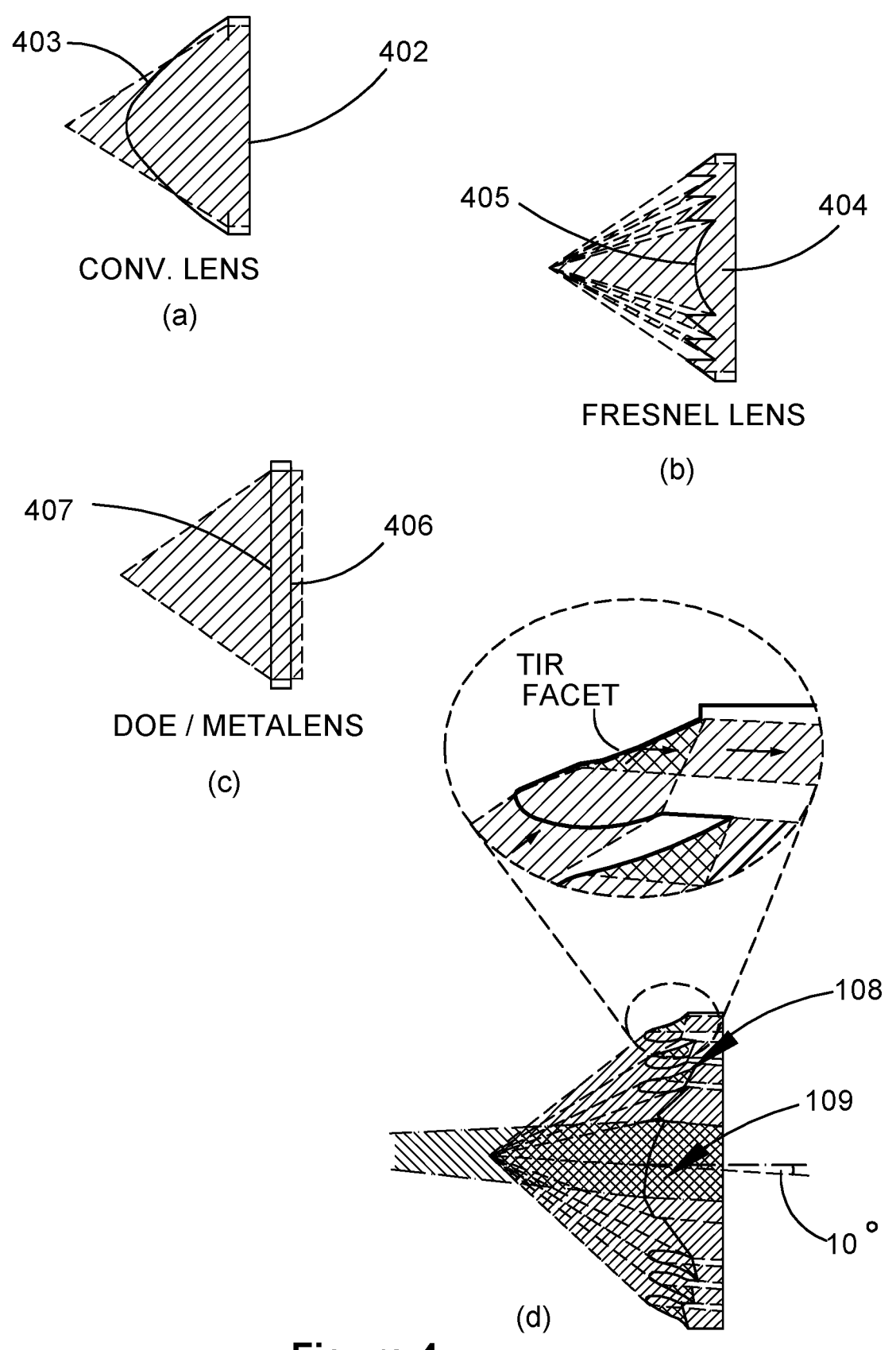
FIGS. 4 (*a*) to (*d*) illustrate optical components in accordance with embodiments of the present invention.

Referring now to FIG. 4 (*a*) to (*d*), examples of lens surfaces that may form the second surface 106 or the optical element 100 are now described. In each example the lens surfaces are shaped such that an inner portion has a larger focal length, a larger depth of field and a smaller numerical aperture whereas an outer portion has a shorter focal length, a larger numerical aperture and a shorter depth of field.

FIG. 4 (*a*) is a schematic cross-sectional representation of a conventional lens 402 shown to illustrate a possible shape of the surface 403, which could form the second surface 106 of the optical element 100 illustrated above with reference to FIGS. 1 to 3. The surface 403 has a non-uniform curvature resulting in an inner portion having a larger focal length than an outer portion.

FIG. 4 (*b*) is a schematic cross-sectional representation of a Fresnel lens 404 shown to illustrate a possible shape of the surface 405, which also could form the second surface 106 of the optical element 100 illustrated above with reference to FIGS. 1 to 3. The surface 405 has an inner Fresnel zone resulting in a larger focal length and an outer Fresnel zone resulting in a shorter focal length.

FIG. 4 (*c*) is a schematic cross-sectional representation of a Metalens 406 having a surface 407, which also could also form the second surface 106 of the optical element 100 illustrated above with reference to FIGS. 1 to 3. The surface 407 is structured such that an inner portion has a larger focal length than an outer portion.

As a further alternative the surface 407 may for example be a surface of a diffractive optical element (DOE) having diffractive properties that result in a larger focal length in an inner portion than in an outer portion.

FIG. 4 (*d*) is a schematic cross-sectional representation of the second surface 106 that comprises more than one type of lens. In this example, the outer portion 108 is a total internal reflection (TIR) lens and the inner portion 109 is a refractive lens. Each TIR facet of the TIR lens uses TIR to redirect light into the optical element 100, as shown in the zoomed inset of FIG. 4 (*d*). The light that passes through the outer portion of the lens may additionally be refracted at a surface of the lens. Using a combination of refraction and TIR in a lens has the advantage of enabling highly compact optical designs with large numerical aperture.

As a further example, the inner portion of the second surface 106 can be a diffractive optical element and the outer portion of the second surface 106 can be a refractive lens.

Figure 5:
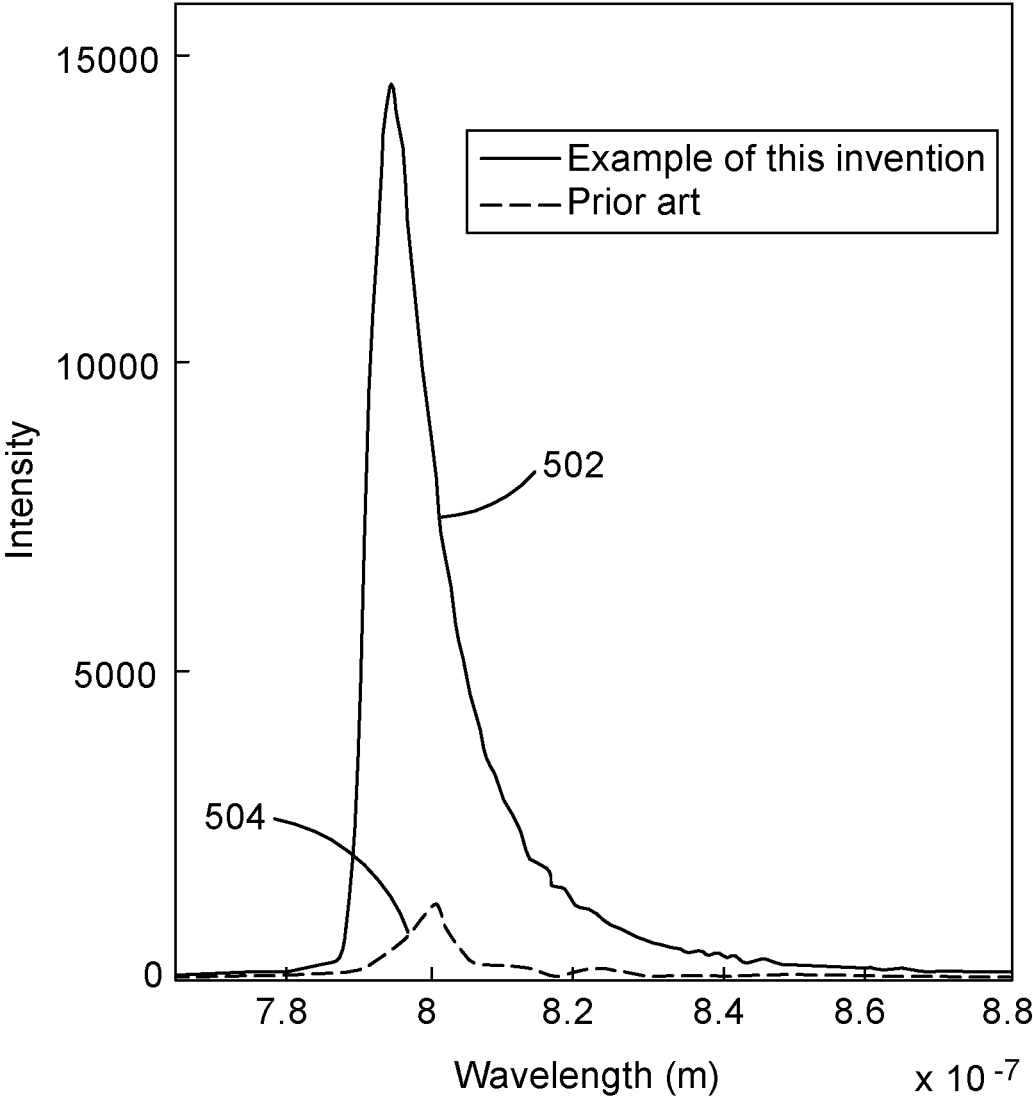
FIG. 5 is a graph showing measurement data obtained using a device in accordance with an embodiment of the present invention.

FIG. 5 is a graph illustrating intensity of fluorescence radiation 502 detected with the device including the optical element in accordance with the present invention compared with the intensity of fluorescence radiation 504 detected using a prior art device. FIG. 5 illustrates that the device including the optical element in accordance with the present invention is capable of higher sensitivity fluorescence measurements than possible using a prior art device, which is a result of the high numerical aperture associated with the outer portion of the second surface of the optical element in accordance with the embodiments of the present invention. In contrast, depth of field of the inner portion of the second surface is advantageous for OCT imaging.

It will be appreciated by a person skilled in the art that the optical element in accordance with embodiments of the present invention may be used for various applications and is not limited to the use for OCT and fluorescence imaging. For example, the optical element may also be used for auto-fluorescence imaging, auto-fluorescence sensing, fluorescence imaging using contrast agents, fluorescence sensing using contrast agents, confocal microscopy, multiphoton microscopy, diffuse optical tomography, total internal reflection fluorescence microscopy, phase contrast microscopy, stimulated emission depletion microscopy, near-field scanning optical microscopy, differential interference contrast microscopy, second harmonic imaging microscopy, reflectance spectroscopy, Raman spectroscopy and optical coherence elastography.

Figure 6:
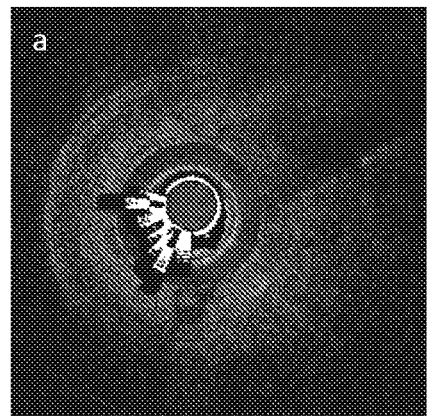
FIG. 6 (*a*)-(*c*) are images obtained using a device in accordance with an embodiment of the present invention.
Figure 6:
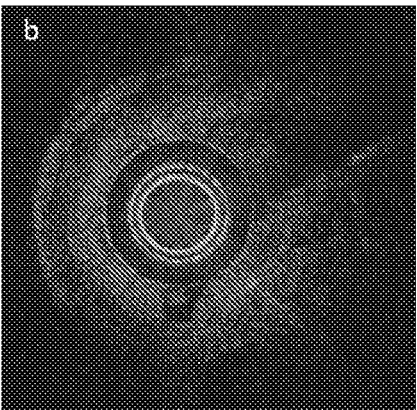
Figure 6:
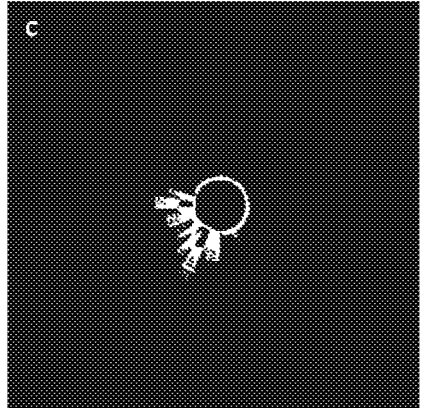

FIG. 6 (*a*) is an exemplary merged OCT and auto-fluorescence image obtained using a device including an optical element in accordance with an embodiment of the present invention. FIG. 6 (*b*) and (*c*) show the corresponding OCT image and auto-fluorescence image, respectively. The images show an atherosclerotic plaque obtained with an example of the invention. A plaque at 6-9 o'clock was confirmed by a high intensity of the detected fluorescence radiation, as shown in FIG. 6 (*a*) and (*c*). In this embodiment the inner portion of the optical element was designed to optimally transmit radiation with a bandwidth of more than 50 nm and the outer portion of the optical element can be designed to optimally transmit radiation with a bandwidth of more than 20 nm.

Figure 7:
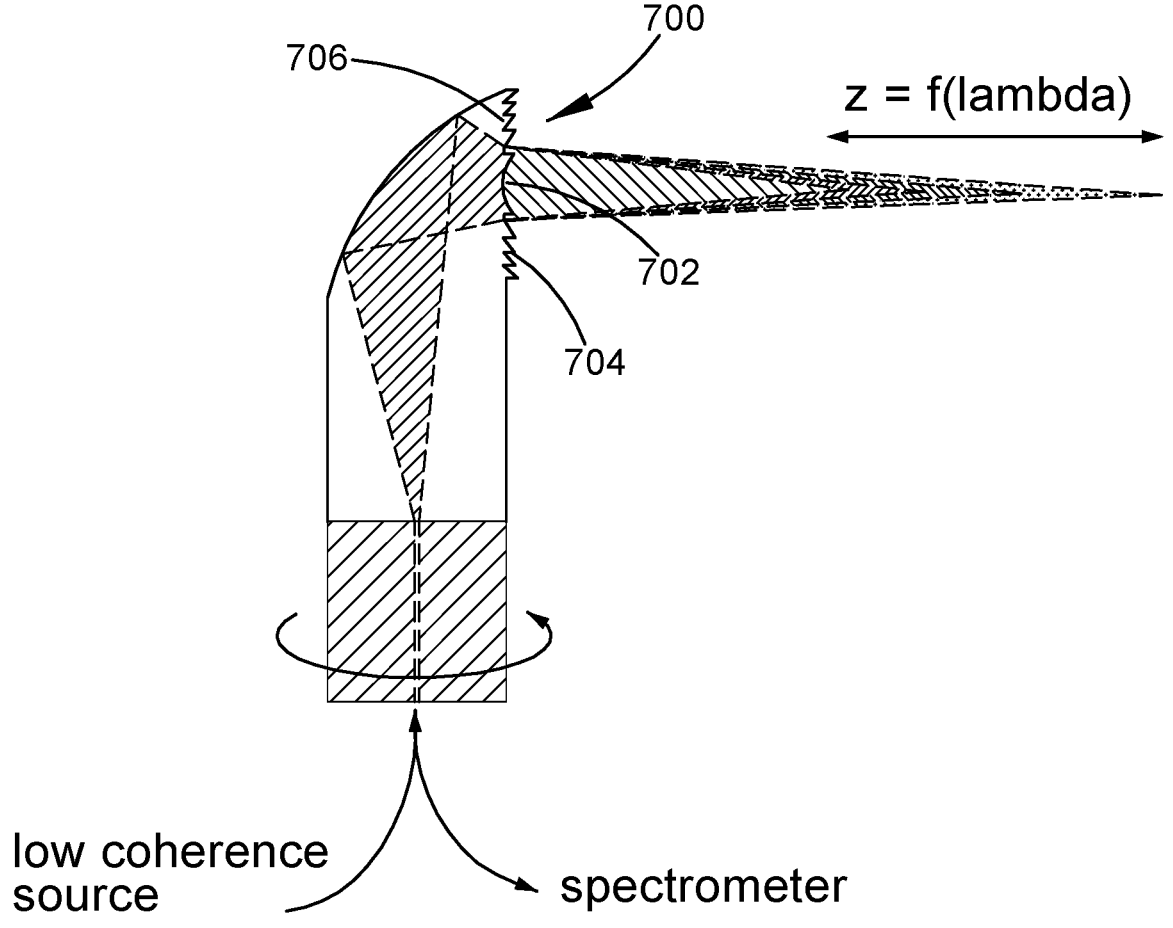
FIG. 7 illustrates an optical element in accordance with a further embodiment of the present invention.
Figure 8:
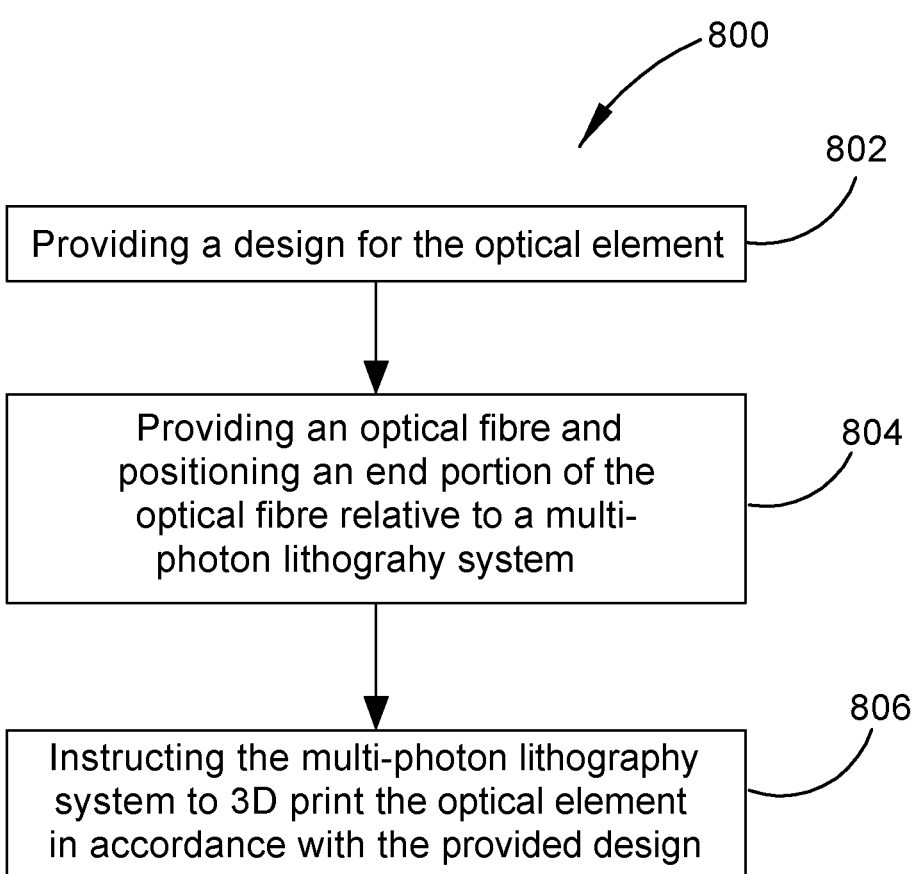
FIG. 8 is a flow chart illustrating a method in accordance with an embodiment of the present invention.

FIG. 7 illustrates an optical element 700 in accordance with a further embodiment of the present invention. In this example an inner portion 702 of the second surface 704 of the optical element 700 is a surface of a diffractive optical element (DOE) and has been optimised for chromatic confocal imaging and allows different wavelength range to be focused at different locations. In FIG. 7, the different wavelength ranges are represented by different shades of grey. Thus, depth-resolved confocal signals can be detected using a spectrometer (not shown) which separates signals from various wavelengths onto different pixels of a detector (not shown). An outer portion 706 of the second surface 704 may also be a surface of a DOE or may, for example, be a Fresnel zone having a shorter focal length and a larger numerical aperture than the inner portion 702.

A person skilled in the art will appreciate that the optical element in accordance with embodiments of the present invention may be used to examine biological tissue and may be used in-vivo and ex-vivo. For example, the optical element may be used for intravascular imaging, diagnosis and treatment, and can also be used for other endoscopic applications, for example for examination of digestive, respiratory, urinary and reproductive systems and ears, and for diagnosing and treating cancers and other diseases. Alternatively, the optical element may be used for examining any type of object including for example pipes, tanks or other structures.

Further, the optical element in accordance with embodiments of the present invention and at least a portion of optical fibre that is optically coupled to the optical element may be positioned within a metal tube or a needle that has an inlet that is transmissive for at least electromagnetic radiation.

Further, the optical element may not necessarily be used for simultaneous measurements associated with different measurement or imaging techniques. The optical element may also be used to acquire multiple measurements or images using a single technique, with the inner and outer portions of the optical element optimised for different acquisition parameters. For example, inner and outer portions of the second surface of the optical element may be optimised for acquiring fluorescence radiation at different depths within an object or within tissue of interest.

A method 800 of forming an optical device in accordance with an embodiment of the present invention is now described. The optical device comprises an optical fibre on which in this embodiment an optical element is formed. The optical element may for example be the optical element 100 described above.

The method 800 comprises the initial step 802 of providing a design for the optical element. Step 802 comprises designing the optical element, for example by using the optical design software "Zemax", and exporting a resulting design in computer aided design (CAD) file format. Further, the design may be further refined using the software "Solidworks" (Dassault Systèmes, France).

The method 800 further comprises step 804 of providing an optical fibre and positioning an end portion of the optical fibre relative to a multi-photon 3D printing system. Step 804 may comprise providing a length of no-core fibre or step-index fibre spliced onto a double clad or single mode optical fibre.

Further, the method 800 comprises step 806 of instructing a multi-photon lithography system to 3D print the optical element in accordance with the provided design.

The multi-photon lithography system allows printing of the optical element directly onto an end of the optical fibre. After mounting the optical fibre using a suitable fibre holder in the multi-photon lithography system, the system is aligned relative to the end of the optical fibre, which can be facilitated by directing light into an opposite end of the fibre. It is then possible to identify the other end of the optical fibre using a CCD camera. The optical element is then printed onto the end of the optical fibre whereby the optical element is integrally formed using a suitable photosensitive material such as "Nanoscribe IP-S".

What is claimed is:

1. An optical element comprising:
   a first surface for emitting and/or receiving electromagnetic radiation, the first surface being arranged for optically coupling to, or being optically coupled to, a portion of an optical fibre, the optical fibre having an axis; and
   a second surface positioned for emitting and/or receiving electromagnetic radiation in a direction transversal to the axis of the optical fibre:
   wherein the optical element has a first focal length for electromagnetic radiation emitted and/or received by an inner portion of the second surface and a second focal length for electromagnetic radiation emitted and/or received by an outer portion of the second surface, the first and second focal lengths being different focal lengths, and
   wherein the inner portion and the outer portion of the second surface are optimised for use of the optical element to acquire measurements at different acquisition parameters using at least two different optical technologies.

2. The optical element of claim 1 wherein the optical element is integrally formed.

3. The optical element of claim 1 wherein the outer portion of the second surface entirely surrounds the inner portion of the second surface.

4. The optical element of claim 1 wherein the first focal length is larger than the second focal length.

5. The optical element of claim 4 wherein a depth of field associated with the inner portion of the second surface is larger than a depth of field associated with the outer portion of the second surface.

6. The optical element of claim 1 wherein the optical element is arranged such that at least a portion or the majority of electromagnetic radiation received within the inner portion of the second surface is directed into a central region, of the optical fibre and at least a portion or the majority of electromagnetic radiation received within the outer portion of the second surface is directed into a region of the optical fibre surrounding the central region.

7. The optical element of claim 1 wherein the outer portion has a focal length that result in numerical aperture greater than the numerical aperture of the inner portion by at least 0.1, 0.2, 0.3, 0.4, 0.5, 0.6, 0.7 or 0.8.

8. The optical element of claim 1 wherein the optical element has a diameter less than 1 mm, 0.5 mm, 0.2 mm or 0.1 mm.

9. The optical element of claim 1 comprising at least one reflective surface, the reflective surface having a reflective coating or a dichroic coating or being positioned for total internal reflection of electromagnetic radiation.

10. The optical element of claim 9 wherein the reflective surface is arranged to direct electromagnetic radiation between the direction along the axis of the optical fibre and the direction transversal to the axis of the optical fibre.

11. The optical element of claim 9 wherein the reflective surface is planar.

12. The optical element of claim 9 wherein the reflective surface comprises a smooth surface portion that is not planar.

13. The optical element of claim 9 wherein the reflective surface is piecewise continuous.

14. The optical element of claim 1 wherein noise of optical signals or cross-talk between optical signal received by the outer portion of the second surface and optical signals received by the inner portion of the second surface is determined by optimising the ratio of the diameter of the outer and inner portions of the second surface.

15. The optical element of claim 1 wherein noise of optical signals or cross-talk between optical signal received by the outer portion of the second surface and optical signals received by the inner portion of the second surface is reduced by use of an isolation element or a reflective surface between the inner and outer portions of the second surface.

16. The optical element of claim 1 wherein the optical element is formed directly on an end portion of the optical fibre.

17. The optical element of claim 1, wherein the optical element is used to acquire measurements using at least two different imaging techniques;
   wherein each of the first focal length and the second focal length is optimal for use with a respective one of the at least two different imaging techniques;
   wherein the first focal length is larger than the second focal length; and
   wherein a depth of field associated with the inner portion of the second surface is larger than a depth of field associated with the outer portion of the second surface.

18. An optical device comprising the optical element in accordance with claim 1, the optical device further comprising an optical fibre coupled to the optical element.

19. The optical device of claim 18 wherein the optical fibre is a no core optical fibre.

20. A method of forming the optical device in accordance with claim 18, the method comprising the steps of:

provinding a design for the optical element;

providing an optical fibre and positioning an end portion of the optical fibre relative to a multi-photon lithography system; and instructing the multi-photon lithography system to 3D print the optical element in accordance with the provided design.

\* \* \* \* \*